United States Patent [19]

Morimi et al.

[11] 4,245,002

[45] Jan. 13, 1981

[54] METHOD OF MAKING FISH PRINTS, AND PAPER AND CLOTH USED THEREFOR

[75] Inventors: Yokichi Morimi, 12-39, Nakahozumi 2-chome, Ibaraki City, Osaka Prefecture, Japan; Masamichi Kuroda, Takarazuka, Japan

[73] Assignees: Fushimi Kabushiki Kaisha, Osaka; Yokichi Morimi, Ibaraki, both of Japan

[21] Appl. No.: 40,081

[22] Filed: May 17, 1979

[30] Foreign Application Priority Data

May 18, 1978 [JP] Japan .................................. 53-59312

[51] Int. Cl.$^3$ ................................................. A61B 5/10
[52] U.S. Cl. ......................................... 428/224; 427/1; 427/150; 427/288; 428/262
[58] Field of Search .................... 427/145, 150, 288, 1; 428/224, 262

[56] References Cited

U.S. PATENT DOCUMENTS

| | | | |
|---|---|---|---|
| 2,715,571 | 8/1955 | Oden | 427/1 |
| 3,288,628 | 11/1966 | Schur et al. | 427/288 |
| 3,985,927 | 10/1976 | Norris et al. | 427/288 |

*Primary Examiner*—James J. Bell
*Attorney, Agent, or Firm*—Wenderoth, Lind & Ponack

[57] ABSTRACT

A method of making fish prints by using paper or silk cloth to which special chemicals which show color reaction to the secretion or humor at the surface of a fish body was previously applied, and paper or silk cloth to be used exclusively for such fish prints.

7 Claims, No Drawings

METHOD OF MAKING FISH PRINTS, AND PAPER AND CLOTH USED THEREFOR

This invention relates to a method of making fish prints, utilizing special chemicals, and paper and cloth used therefor.

The population of anglers has increased rapidly in recent years and it has been desired by many anglers to keep records of some of the fishes they caught in size and shape for contests and other purposes, for which fish print or transferring of the fish body to paper so silk cloth by using a colorant is generally practised. Conventionally, two methods are available for making a fish print. One is to apply India ink to the body of a caught fish and then place China paper or silk cloth thereon for transferring (direct method). The other is to stick paper or silk cloth to the wet body of a caught fish and then tap something like a tampon infiltrated with India ink on the paper or the silk cloth (indirect method). In some cases, colors are used instead of India ink for producing artistic effect.

The making of fish prints using India ink or colors requires special techniques and is very difficult for non-professionals. Moreover, the making of fish prints using India ink or colors has the following defects.

If a fish intended for fish print jumps about, it is difficult to apply India ink uniformly to the body of the fish. As the slippery humor on the surface of a live fish (which is necessary for the fish to live) must be wiped off before applying India ink, the fish will die during the process and become uneatable. Since China paper is usually used for fish prints, if the finished fish prints get wet, the India ink will run, with the result that they become fuzzy. Moreover, the conventional method of making fish prints is complicated and it is impossible to copy exactly the natural size and shape of a caught fish. Instead of fish prints, some utilize a photographing method but this method does not produce realistic effects.

The present invention is described below with reference to a preferred embodiment.

The humor which a fish secretes at the surface of its body is essential for the fish to live in the sea or in freshwater. Chemically, this humor is a kind of alubumen and amino acid. the present invention has for its object the making of fish prints by utilizing the chemical properties of this secretion at the surface of the fish body, namely, by reproducing various colors by using proper chemicals which show a color reaction bond and react to the seretion of a fish.

As to the color reaction, we can enumerate the following reactions Abderhalden's reaction, burette reaction, xanthoprotein reaction, Millon's reaction, Sakaguchi's reaction, Pauly's reaction, Folin's reaction, Adamkiewicz reaction, Liebermann reaction, Neubauer-Rhode's reaction and so on.

The chemicals used for a burette reaction are caustic soda and copper sulfate. Undiluted nitric acid is used for the xanthoprotein reaction. Mercury, fuming nitric acid, etc. are used for Millon's reaction.

A method of making fish prints by utilizing Abderhalden's reaction is shown below.

(1) Firstly a 1% ninhydrine aqueous solution is applied.

(2) Then, the above aqueous solution is applied, in a quantity necessary for showing color reaction to the secretion at the surface of the fish body, to China paper or silk cloth of the required size. This application can be effected by brush coating, soaking, roller coating, etc.

(3) Then, the China paper or silk cloth applied with the aqueous solution is dried in a comparatively low temperature atmosphere. The drying temperature should be at such a degree that chemicals do not change in quality beyond the color reaction, preferably the drying temperature is below 100° C.

(4) After drying, the China paper or silk cloth is cut where necessary.

In making fish prints using paper or silk cloth processed as mentioned above, a fish intended for print is taken out of the water and placed sideways on a flat wooden board, a flat plastic board or a flat paper board, and moisture on the surface of the fish body is wiped off lightly with a towel or the like. In this case, care must be taken so that the secretion or humor of the fish may not be wiped off. Then, China paper or silk cloth processed as above is placed and pressed lightly on the fish body so that the whole shape of the fish can be copied. Then, the China paper or the silk cloth is separated from the fish and is dried, whereupon a color reaction is shown by the chemicals applied previously to the paper or the silk cloth and the secretion on the surface of the fish body and thus the desired fish print is obtained.

According to the present invention, fish prints are effected by utilizing reaction by chemicals, instead of coloring with India ink or coloring materials, and therefore colors once obtained on paper or silk cloth are stable and are free from solution in water, acid, alkali, soap water, alcohol, thinner, etc. The chemicals to be used are almost colorless and nonpoisonous and also free from pollution. Moreover, since the secretion on the surface of a live fish is not removed in making a fish print, the fish is kept alive during the process and thus can be put back into the river and the sea or can be used for food.

According to the present invention, coloring is effected simply by placing and pressing lightly paper or silk cloth on the surface of a fish body and by drying the paper or the silk cloth. Thus, the fish print can be made quickly and easily without the necessity of difficult technique.

What is claimed is:

1. A method of making fish prints on paper or cloth which comprises applying a paper or cloth to the surface of the fish to form an imprint of the fish upon the cloth or paper, said paper or cloth being previously treated with a chemical which shows a color reaction to the humor secreted at the surface of the fish, and drying the cloth or paper.

2. A method according to claim 1 wherein the chemicals are selected from (1) the combination of caustic soda and copper sulfate, (2) nitric acid, (3) mercury and fuming nitric acid or (4) 1.0% ninhydrine solution.

3. A method according to claim 1 or 2 wherein the cloth is a silk cloth.

4. A method according to claim 1 or 2 wherein the paper or cloth containing the fish print thereupon is dried at temperatures below 100° C.

5. A paper or cloth for forming fish prints thereupon which comprises a paper or cloth treated with chemicals which show a color reaction to the humor secreted at the surface of a fish body.

6. A cloth according to claim 5 made of silk treated with said chemicals.

7. A cloth or paper according to claim 5 wherein the chemicals are selected from (1) the combination of caustic soda and copper sulfate, (2) nitric acid, (3) mercury and fuming nitric acid or (4) 1.0% ninhydrine solution.

* * * * *